G. HORNIACHEK.
MOTOR SLEIGH.
APPLICATION FILED MAR. 3, 1916.

1,232,802.

Patented July 10, 1917.
2 SHEETS—SHEET 1.

Inventor
G. Horniachek

By A. M. Wilson
Attorney

G. HORNIACHEK.
MOTOR SLEIGH.
APPLICATION FILED MAR. 3, 1916.
1,232,802.
Patented July 10, 1917.
2 SHEETS—SHEET 2.
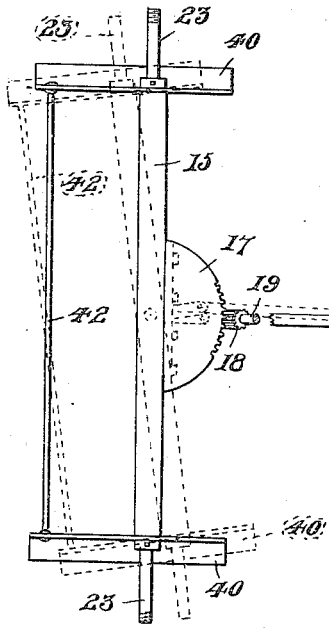
Fig. 4.
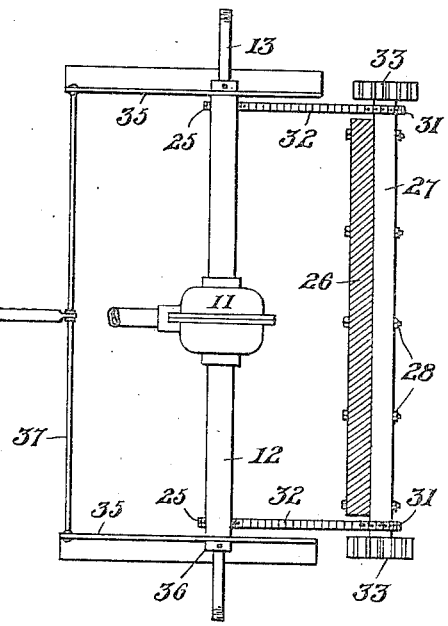
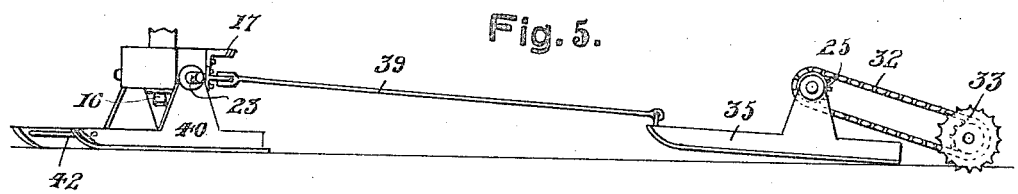
Fig. 5.
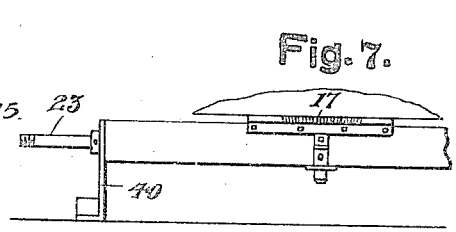
Fig. 6.  Fig. 7.
Inventor
G. Horniachek
By N. M. Wilson
Attorney

UNITED STATES PATENT OFFICE.

GEORGE HORNIACHEK, OF ROULEAU, SASKATCHEWAN, CANADA.

MOTOR-SLEIGH.

1,232,802.   Specification of Letters Patent.   Patented July 10, 1917.

Application filed March 3, 1916. Serial No. 81,994.

*To all whom it may concern:*

Be it known that I, GEORGE HORNIACHEK, a subject of the King of Hungary, residing at Rouleau, in the Province of Saskatchewan and Dominion of Canada, have invented certain new and useful Improvements in Motor-Sleighs, of which the following is a specification.

This invention relates to certain new and useful improvements in motor sleigh.

The primary object of this invention is the provision of a convertible motor vehicle adapted for employment either as an automobile or as a sleigh, it being only necessary to remove the wheels of the automobile to convert the same into a motor sleigh.

A further object of the device is to provide a sleigh which is adapted to be propelled by a motor positioned therein, the steering mechanism being such as to automatically tilt the rear runners into engagement with the roadbed during the steering operation of the forward wheels and whereby the rear runners are tilted to a retarding position in rounding corners.

The invention contemplates a motor vehicle in the form of an automobile having a pivoted forward steering axle and with pairs of sleigh runners pivoted to each axle, a connection being arranged between the said runners and a propelling means being operatively engaged to the motor driving mechanism of the automobile.

With these general objects in view and others that will appear as the nature of the invention is better understood, the same consists in the novel combination and arrangement of parts hereinafter more fully described, illustrated in the accompanying drawings and pointed out in the appended claims.

In the drawings forming a part of this application and in which like-designating characters refer to corresponding parts throughout the several views:—

Fig. 4 is a top plan view of the chassis with the wheels removed and parts broken away.

Fig. 5 is a side elevation thereof.

Fig. 6 is an elevational view of a portion of the rear axle and housing, and

Fig. 7 is a similar view of the front axle.

Figure 1:
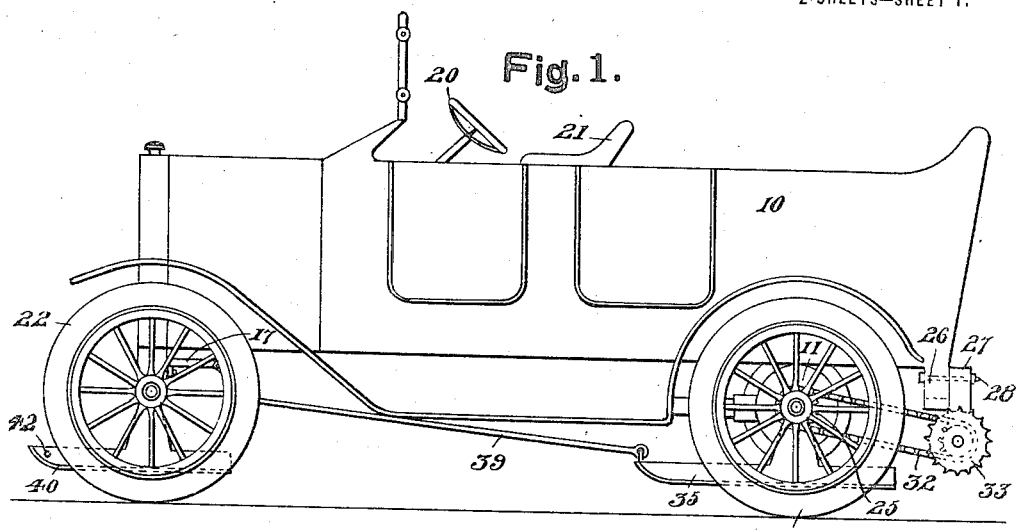
Figure 1 is a side elevation of the device arranged as an automobile.

Referring to the drawings, the present embodiment of the invention is illustrated in connection with an automobile 10 having a differential casing 11 and rear axle housings 12 provided with the usual motor driven axle portions 13 upon which the usual rear traction wheels 14 are secured.

The forward axle 15 is centrally pivoted as by means of a king bolt 16, the axle being shifted in the steering operation by means of a toothed rack 17 having a pinion 18 of a steering post 19 in constant mesh therewith, the said post being provided with the usual steering wheel 20 adjacent the driver's seat 21 of the vehicle.

The forward wheels 22 are journaled upon the outer spindles 23 carried by the front axle 15. The rear axle housing 12 is provided with cut-away portions 24 for the accommodation of sprocket wheels 25 carried by the axle portion 13 and adjacent the outer ends of the housing. A beam 26 is arranged transversely of the body of the automobile 10 at the rear lower edge thereof, and a mounting plate 27 is vertically adjustably secured thereto by means of a plurality of bolts 28 carried by the plate 27 and engaging through slots 29 of the beam 26.

A shaft 30 is journaled longitudinally through the plate 27 having sprocket wheels 31 secured adjacent its opposite ends, while sprocket chains 32 are operatively positioned over the sprocket wheels 31 and 25. Ground-engaging grooved or spiked wheels 33 are secured to the opposite ends of the shaft 30, and whereby as is also evident, the operation of the motor (not shown) of the vehicle will forcibly revolve the wheels 33 into contact with the road surface or ice 34 for moving the sleigh either forwardly or rearwardly.

Rear runners 35 are pivoted upon rear axles 13 being retained against relative longitudinal movement therewith by means of stop collars 36. A bar 37 connects the forward ends of the runners 35 and is pivotally connected centrally to a centrally arranged lug 38 carried by the front axle 15 by means of a rod 39.

Forward runners 40 are pivotally mounted upon the spindles 23 of the front axle 15 being retained thereon by stop collars 46, a connecting bar 42 being secured between the forward ends of the runners 40.

The automobile 10 is ordinarily operated in the usual manner upon its ground wheels 14 and 22. When desired to convert the vehicle into a motor sleigh all of the wheels 14 and 22 are removed which allows the runners 35 and 40 to engage the roadbed 44 and operatively support the vehicle thereon. The lowering of the vehicle also brings the propelling wheels 33 into operative engagement with the roadbed 34, while the adjustment thereof may be regulated by means of the afore-mentioned bolts 28.

Figure 2:
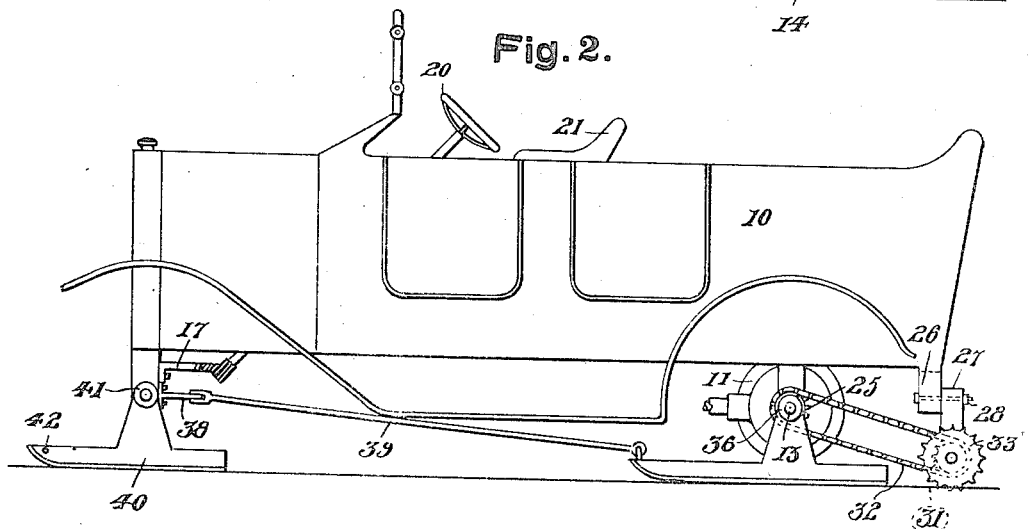
Fig. 2 is a similar view thereof arranged as a motor sleigh.
Figure 3:
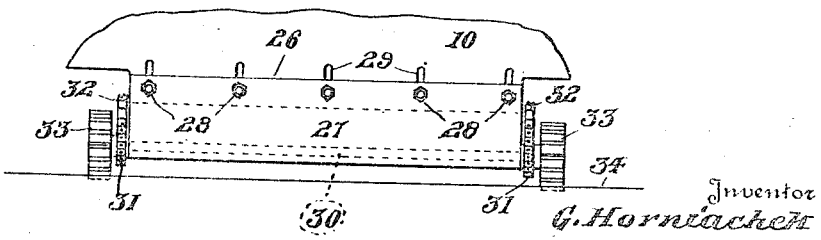
Fig. 3 is a rear elevation of a portion of the sleigh and the propelling means therefor.

The operation of the motor will then turn the wheels 33 in either direction desired by means of the operative connections between the shaft 30 and the rear axles 13. During the steering operation and in traveling in curved paths, the forward runners 40 and axle 15 will be pivotally shifted by means of the steering wheel 20 to the position shown in dotted lines in Fig. 4. By reason of the inclination of the rod 30 and its pivotal attachment between the lug 38 and the lower positioned connecting bar 37, the rear runners 35 will be tilted as best illustrated in Fig. 5 of the drawing, thus bringing the rear ends of the runners into scraping contact with the roadbed 34, the said rear runners will therefore slightly impede the forward movement of the motor sleigh when the sleigh is turning a corner or moving in a circular or arcuate path which will tend to prevent accidents, and the sliding and tipping of the sleigh. It will be understood that when the forward runners are again turned to their normal positions that the rear runners 35 will be lowered into flat engagement with the road bed 34, as best illustrated in Fig. 2. It will thus be evident that a motor vehicle is arranged that may be easily converted from an automobile to a sleigh and which is readily operated from the usual motor carried thereby.

While the form of the invention herein shown and described is what is believed to be the preferred embodiment thereof, it is nevertheless to be understood that minor changes may be made therein without departing from the spirit and scope of the invention as claimed.

What I claim as new is:—

1. A motor vehicle comprising a body having rear driving axles, a pivoted forward steering axle carried by the said body, rear runners pivoted to the said rear axles, a rearwardly projecting lug centrally carried by the forward axle and a normally inclined rod pivotally connecting the said lug and the said rear runners.

2. A motor vehicle comprising a body having rear driving axles, a pivoted forward steering axle carried by the said body, rear runners pivoted to the said rear axles, a rearwardly projecting lug centrally carried by the forward axle, a normally inclined rod pivotally connecting the said lug and the said rear runners, whereby the said rear runners are impedingly tilted during the steering operation, and a rearwardly positioned traction means operatively connected to the said rear axle.

3. A motor vehicle comprising a body having rear driving axles, a pivoted forward steering axle carried by the said body, rear runners pivoted to the said rear axles, a rearwardly projecting lug centrally carried by the forward axle, a normally inclined rod pivotally connecting the said lug and the said rear runners, whereby the said rear runners are impedingly tilted during the steering operation, sprocket wheels secured to the said axles, a transverse beam secured beneath the lower rear edge of the body and having vertical slots therein, a mounting plate flatly engaging the said beam, adjusting bolts carried by the said plate and extending through the said slots, a shaft journaled longitudinally of the said plate, operative connections between the said shaft and sprocket wheels, and ground-engaging toothed traction wheels secured to the outer ends of the said shaft and shifting means for the said forward axle.

In testimony whereof I affix my signature.

GEORGE HORNIACHEK.

Witness:
M. M. DEANE.

Copies of this patent may be obtained for five cents each, by addressing the "Commissioner of Patents, Washington, D. C."